June 18, 1963  D. N. GOLDSTEIN  3,094,311
TURBINE ACCELERATION CONTROL SYSTEM
Filed Oct. 30, 1961
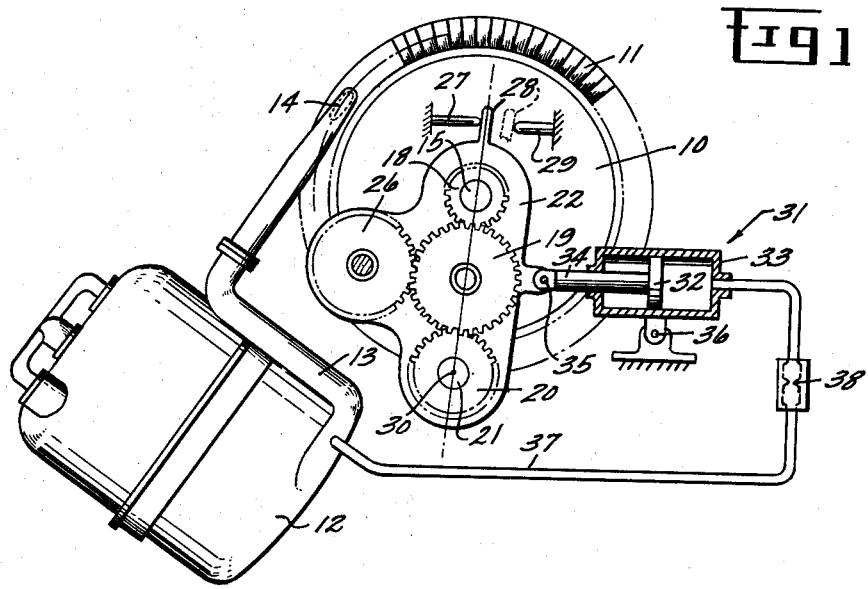
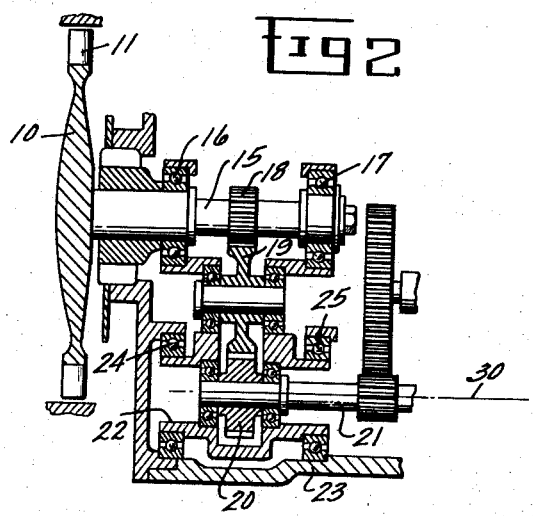
INVENTOR.
DAVID N. GOLDSTEIN
BY Lawrence G. Norris
ATTORNEY—

United States Patent Office 3,094,311
Patented June 18, 1963

3,094,311
TURBINE ACCELERATION CONTROL SYSTEM
David Noah Goldstein, Marblehead, Mass., assignor to General Electric Company, a corporation of New York
Filed Oct. 30, 1961, Ser. No. 148,517
5 Claims. (Cl. 253—59)

My invention relates to acceleration control systems for fluid turbines, and in particular to an improved acceleration control system for gas turbine starters.

My invention is an improvement over an acceleration control system described and claimed in co-pending application entitled, "Acceleration Control For Fluid Turbines," Serial No. 148,512, filed in the name of Philip Dantowitz and assigned to the assignee of this application. In the Dantowitz application, there is described an acceleration control system utilizing a movably mounted turbine wheel and having means for varying the degree of immersion of the wheel in the motive fluid stream. The system allows the net torque on the wheel, which is the excess in the torque generated by the motive fluid over the load reaction torque, to be controlled as a function of a reference force, thereby permitting acceleration control of the turbine. In other words, the net torque applied to the wheel after the load reaction torque has been subtracted is specified by the magnitude of the reference force.

One application of this concept is in the field of small gas turbine power units, such as turbine starters for gas turbine engines. In this type of application, a small gas turbine power unit is used to drive the rotor of the engine being started up to self-sustaining speed. Such units may receive their power from various types of motive fluid sources, such as a propellant cartridge, a fuel-air combustion system, or a source of compressed air.

In the case of the cartridge type starter, one of the problems that is encountered relates to the variation in burn rate of the propellant with ambient temperature. In the typical case, the propellant will have a much higher burn rate at the higher temperatures than at the lower temperatures. In fact, for some propellants, the burn rate at 160° F. is about twice the burn rate at —65° F., these temperatures representing roughly the range of operating temperatures for which most equipment of this kind must be designed.

Now in the typical case where acceleration control of the starting cycle of a jet engine is to be provided, the requirement for acceleration control is generally imposed by the low temperature starting characteristics of the engine, and as the ambient temperature is increased, higher acceleration rates may be tolerated. Thus, if a preselected acceleration characteristic is provided, say for purposes of explanation a constant acceleration rate, that rate is determined primarily by the low temperature starting characteristics of the engine. If the amount of propellant required is sized, however, for the low temperature condition and the same acceleration rate is scheduled at the high temperature conditions, the starter will not be capable of reaching the required cutout speed at the higher temperatures because the propellant burn time at the high temperature limit is substantially less, in the typical case about one-half, than the burn time at the low temperature limit. In other words for the same acceleration rate but only one-half the burn time, the starter would reach only about one-half the required cutout speed.

What this means, assuming a movable turbine wheel arrangement of the type described and claimed in the above-mentioned Dantowitz application, is that the wheel is moved further out of the gas stream at the higher temperature, higher flow rate conditions to maintain the pre-selected acceleration schedule, thus permitting a greater proportion of the propellant to pass by the outer periphery of the wheel without being utilized for torque generating purposes. In order to avoid the foregoing problem, it is thus desirable to take advantage of the higher acceleration rate permitted at the higher temperature conditions.

In addition, some variations in burn rate are encountered even at the same ambient temperatures because of production tolerances applied in the manufacture of the propellant. Here again then, with a constant acceleration schedule, the starter will not be able to reach the required cutout speed with cartridges on the high side of the burn rate tolerance.

It is accordingly one object of my invention to provide an improved acceleration control for fluid turbines in which the acceleration rate which is scheduled is automatically varied as a function of the pressure level of the motive fluid supplied to the turbine.

It is another object of my invention to provide an improved acceleration control for cartridge starters in which the acceleration rate of the starter is automatically increased with increasing propellant burn pressures corresponding with increasing burn rates.

Another consideration which enters into the design of gas turbine starters is the problem of high initial torques connected with the initiation of the start cycle. These result from the ignition pressure peaks which occur on the firing of the propellant and from the initial delay in the acceleration control in reducing the torque to the scheduled level.

It is therefore another object of my invention to provide an improved acceleration control for cartridge starters in which means are provided for reducing the magnitude of the impact torque which occurs upon ignition of the propellant.

I accomplish these and other objects of my invention, in one embodiment thereof, by providing in a cartridge starter, a movable wheel system having a force balancing arrangement as described and claimed in the above-mentioned Dantowitz application, and in which the reference force applied to the movable mounting means is proportional to the pressure in the cartridge breech, which pressure is in turn proportional to the burn rate of the propellant. The magnitude of the reference force, which determines the turbine acceleration rate, is thus made proportional to the burn rate of the propellant such that at the higher burn rates corresponding to the higher ambient temperatures, a higher acceleration rate is automatically scheduled. Similarly, at the minimum ambient temperature limit, the acceleration rate is automatically limited to the lower level required by the engine starting and light-off characteristics.

In addition, I provide time delay means, which in one embodiment I have shown in the form of a flow limiting orifice in the line connecting breech pressure to an actuator which develops the pressure proportional reference force, and which operate to delay the buildup of the reference force level at ignition. Thus, at light-off of the propellant, the acceleration rate is held to a much lower level than the scheduled rate and is permitted to build up smoothly as the reference force increases to its steady state level by the charging of the actuator through the flow limiting orifice. This avoids the high torque peaks otherwise associated with propellant ignition.

Other objects and advantages of my invention will become apparent from the following description taken in connection with the accompanying drawing in which:

FIG. 1 is a schematic presentation of the essential elements of a cartridge starter acceleration control system embodying my invention, and FIG. 2 is a side view of the turbine wheel mounting arrangement of FIG. 1.

Referring now to the drawing, I have shown a cartridge starter having an axial flow turbine wheel 10 with peripherally mounted buckets 11 adapted to be driven by hot gases supplied from a breech 12 through a conduit 13 and a nozzle 14. The breech 12 is adapted to receive a cartridge of solid propellant which is ignited upon initiation of the start cycle and which then burns until fully spent.

The turbine wheel 10 is supported on a shaft 15 which is in turn rotatably supported in a pair of bearings 16 and 17. Secured to the turbine shaft between the bearings 16 and 17 is a pinion 18 which drives output gears 19 and 20. The gear 20 is connected to drive into an output gear train through a shaft 21.

The gears 18, 19 and 20 and the turbine wheel bearings 16 and 17 are supported in a yoke 22 which is pivotally mounted in a turbine casing 23 on a pair of bearings 24 and 25. The turbine is thus rotatably supported in movable mounting means which permit the degree of immersion of the wheel in the motive fluid stream issuing from the nozzle 14 to be varied to control the magnitude of the torque generated by the motive fluid on the wheel. The degree of immersion of the turbine wheel in the motive fluid stream is controlled by the magnitude of a reference force applied to the pivotally mounted yoke in the manner described in the Dantowitz application. In the embodiment illustrated, pump means, not shown, are driven by a gear 26 which is rotatably supported in the yoke and which is driven by the gear 19. The reaction torque of the pump means applies a speed dependent force to the yoke to balance out the effects of the speed dependent torque resulting from the wheel losses, an arrangement also described in the above-mentioned Dantowitz application.

The system is provided with a stop 27 which engages a tang 28 on the yoke at the fully immersed position of the wheel and a second stop 29 is positioned to engage the tang at the selected minimum immersion position. The pivot axis 30 of the yoke is laterally displaced slightly from the rotational axis of the turbine such that when the system is at rest, the yoke 22 rests against the stop 29 with the wheel in is minimum torque position.

The operation of the basic movable wheel system in which the acceleration of the turbine wheel may be controlled in response to a reference force applied to the movable yoke 22 is fully described in the above-mentioned Dantowitz application. Suffice it to say here, therefore, that the net torque on the turbine wheel 10, which is defined as the difference between the torque generated on the wheel by the motive fluid and the load reaction torque, may be controlled as a function of the magnitude of the reference force applied to the movably mounted means, in this case the pivotally mounted yoke 22. Thus, if a speed dependent force is applied to the yoke which substantially balances the speed dependent characteristics of the torque resulting from the wheel losses, the acceleration rate of the wheel may be made directly proportional to the magnitude of an additional reference force applied to the yoke.

I utilize this characteristic of the Dantowitz system to control the acceleration rate of the turbine wheel 10 as a function of the pressure in the breech 12. This is accomplished, in the embodiment of my invention shown, by the provision of a piston type actuator 31 formed of a piston 32 slidably mounted in a cylinder 33. Connected to the piston 32 is a shaft 34 which transmits the actuator force to the yoke 22 through a pin connection 35. The actuator is pivotally mounted on a pin mount 36 to accommodate the movement of the yoke over its full range of positions. The actuator 31 is connected to respond to the gas pressure in the breech 12 through a conduit 37. Positioned in the connecting conduit 37 is a flow limiting orifice 38, the function of which will be subsequently explained.

It will be observed that, in operation, the actuator 31 applies a reference force to the yoke 22, the magnitude of which is directly proportional to the propellant burn pressure in the breech 12. Because the flow area of the nozzle 13 is fixed, the higher propellant burn rates which occur at the higher ambient temperatures will produce correspondingly higher pressures in the breech 12, and the actuator 31 will accordingly respond to produce a higher reference force and thereby schedule a higher acceleration rate under these conditions. Conversely, at the lower ambient temperatures, the lower burn rates will result in the generation of a smaller reference force such that a lower acceleration rate is automatically scheduled.

Thus, with the system described above, a preselected acceleration characteristic may be chosen to accommodate the low temperature starting characteristic of the engine being started without compromising the ability of the starter to reach a preselected cutout speed at the maximum ambient temperature point. In addition, the ability of the starter to reach a preselected cutout speed over a wide range of propellant burn rates may be assured.

In addition I have provided, as pointed out above, a flow limiting orifice 38 in the conduit 37 which connects the actuator 31 to the breech 12. The function of the flow limiting orifice is to limit the rate at which the pressure in the actuator 31, and hence the magnitude of the reference force applied to the yoke, can build up. It will be observed that, with the system at rest and upon ignition of the propellant in the breech 12, the yoke 22 is at rest against the stop 29 with the wheel in its minimum torque position. This position can be selected such that the pressure peaks which occur upon propellant ignition cannot develop excessive torque peaks on the wheel 10. The time delay imposed by the flow limiting orifice 38 on the build up of pressure in the actuator 31 prevents substantial movement of the wheel into the gas stream until these initial transients have subsided.

It will be thus observed that my invention provides an arrangement in which the acceleration rate of a turbine starter may be automatically increased as a function of propellant burn pressure which is in turn proportional to the propellant burn rate. This allows for optimum use of propellant over the full range of operating conditions while still permitting a preselected acceleration schedule to be imposed at the low temperature conditions. In addition, the system avoids the torque peaks normally associated with the initiation of the start cycle.

While my system is obviously applicable to cartridge starters, other applications may occur to those skilled in the art. In addition, it will be apparent that modifications may be made in the particular embodiment presented. For example, pressure sensitive force generating means other than the piston type actuator 31 may be employed. In addition, other arrangements for movably mounting the turbine wheel 10 may be utilized.

In light of the foregoing it will be apparent that various modifications, changes and substitutions may be made in the embodiment presented herein without departing from the true scope and spirit of my invention as I have defined it in the appended claims.

What I claim as new and desire to secure by Letters Patent of the United States is:

1. In a fluid turbine having an axial flow turbine wheel, a supply of motive fluid under pressure, and means for directing a stream of said motive fluid against said wheel; means for controlling the acceleration rate of said wheel comprising:

(a) movable mounting means supporting said turbine wheel and adopted to move the wheel into and out of the motive fluid stream to vary the amount of torque generated on the wheel by the motive fluid stream, (b) means connecting said wheel to a load through gearing means mounted in said movable mounting means, (c) means transmitting the forces imposed on said wheel and said connecting means by the motive fluid stream and the load to said mounting means such that the net effect of said forces on said mounting means is proportional to the actual net torque on the wheel and in a direction to move said wheel out of the motive fluid stream, (d) and means responsive to the pressure of said motive fluid supply imposing a reference force proportional to a desired net torque on the wheel on said mounting means in a direction to move said wheel into the motive fluid stream, (e) whereby said mounting means is moved to an equilibrium position in which the actual net torque on the wheel is equal to the desired net torque specified by the pressure of said motive fluid supply.

2. In a fluid turbine having an axial flow turbine wheel, a supply of motive fluid under pressure, and means for directing a stream of said motive fluid against said wheel; means for controlling the acceleration rate of said wheel comprising:

(a) movable mounting means supporting said turbine wheel and adopted to move the wheel into and out of the motive fluid stream to vary the amount of torque generated on the wheel by the motive fluid stream, (b) means connecting said wheel to a load through gearing means mounted in said movable mounting means, (c) means transmitting the forces imposed on said wheel and said connecting means by the motive fluid stream and the load to said mounting means such that the net effect of said forces on said mounting means is proportional to the actual net torque on the wheel and in a direction to move said wheel out of the motive fluid stream, (d) means imposing a speed dependent force on said movable mounting means which varies as a function of the speed of said wheel and which is in a direction to move the wheel into said motive fluid stream, (e) and means responsive to the pressure of said motive fluid supply imposing a reference force on said mounting means in a direction to move the wheel into said motive fluid stream, (f) the net effect of said speed dependent force and said pressure responsive force on said mounting means being proportional to a desired net torque, (g) whereby said mounting means is moved to an equilibrium position in which the actual net torque on the wheel is equal to the desired net torque specified by the pressure of said motive fluid and the speed of the wheel.

3. Apparatus as set forth in claim 2 including time delay means associated with said pressure responsive reference force imposing means for delaying the build up of said reference force in response to increases in the pressure of said motive fluid supply.

4. In a fluid turbine having an axial flow turbine wheel, a supply of motive fluid under pressure, and means for directing a stream of said motive fluid against said wheel; means for controlling the acceleration rate of said wheel comprising:

(a) a yoke rotatably supporting said wheel and pivotally mounted for angular movement in a plane parallel to the plane of said wheel to move said wheel to vary the degree of immersion of the wheel in said gas stream, (b) gearing means mounted in said yoke, (c) means connecting said wheel to the load through said gearing means, (d) means transmitting the forces imposed on said turbine wheel and said connecting means by the motive fluid stream and the load to said yoke such that a net moment proportional to the actual net torque on the wheel is imposed on the yoke in a direction to decrease the degree of immersion of the wheel in the gas stream, (e) means imposing a speed dependent force on said yoke which varies as a function of the speed of said wheel to produce a moment on said yoke in a direction to increase the degree of immersion of the wheel in the gas stream, (f) and means responsive to the pressure of said motive fluid supply imposing a reference force on said yoke to produce a moment on said yoke in a direction to increase the degree of immersion of the wheel in the gas stream, (g) the sum of moments produced by said speed dependent force and said pressure responsive force on said yoke being proportional to a desired net torque, (h) whereby said yoke pivots to an equilibrium position in which the actual net torque on the wheel is equal to the desired net torque specified by the the pressure of said motive fluid and the speed of said wheel.

5. Apparatus as set forth in claim 4 including time delay means associated with said pressure responsive reference force imposing means for delaying the build up said reference force in response to increases in the pressure of said motive fluid supply.

References Cited in the file of this patent

UNITED STATES PATENTS

| | | |
|---|---|---|
| 2,614,798 | Rubbra | Oct. 21, 1952 |
| 2,685,428 | Tressl | Aug. 3, 1954 |
| 2,689,707 | Graham et al. | Sept. 21, 1954 |